United States Patent
Yata

[11] Patent Number: 5,812,211
[45] Date of Patent: Sep. 22, 1998

[54] IMAGE SIGNAL PROCESSING APPARATUS FOR PROMPTER

[75] Inventor: Kunio Yata, Omiya, Japan

[73] Assignee: Fuji Photo Optical Co., Ltd., Omiya, Japan

[21] Appl. No.: 811,044

[22] Filed: Mar. 4, 1997

[30] Foreign Application Priority Data

Mar. 8, 1996 [JP] Japan ................................ 8-080997

[51] Int. Cl.$^6$ ........................... H04N 5/262; H04N 5/272; H04N 5/278; H04N 5/445
[52] U.S. Cl. ........................... 348/563; 348/629; 348/722
[58] Field of Search ........................... 345/123, 124; 348/16, 563, 578, 589, 607, 625, 629, 716, 718, 722; H04N 5/262, 5/272, 5/278, 5/445

[56] References Cited

U.S. PATENT DOCUMENTS

| 4,602,251 | 7/1986 | Sawada et al. ................... 345/123 |
| 5,146,329 | 9/1992 | Flamm ................................ 348/607 |
| 5,432,563 | 7/1995 | Kasahara .......................... 348/629 |
| 5,555,443 | 9/1996 | Ikehama .............................. 348/16 |
| 5,715,019 | 2/1998 | Yata .................................. 348/722 |
| 5,721,586 | 2/1998 | Shimamura et al. ............. 348/722 |

Primary Examiner—Richard Lee
Attorney, Agent, or Firm—Ronald R. Snider

[57] ABSTRACT

The image signal processing apparatus for prompter provides a screen easy to view from which horizontal flickering on an image in horizontal scroll is eliminated. In a unit for displaying image data of a manuscript with interlace scanning, and horizontally scrolling the displayed manuscript in various speeds, a timing signal generator circuit generates clock signals with half a cycle shift, and a control circuit reads and processes even fields with clock signals with half a cycle shift at a scroll speed of, for example, a screen/six seconds, and reads and processes the last one of three continuous fields with the clock signals with half a cycle shift at a scroll speed of a screen/12 seconds. This enables it to continuously move pixels in the horizontal scroll.

4 Claims, 10 Drawing Sheets

(A) I/O PORT HIGH CLOCK SIGNAL (B) DATA (C) I/O PORT LOW CLOCK SIGNAL (D) DATA

1 ODD, 2 EVEN

FIG. 13B

3 ODD, 4 EVEN

FIG. 14

(W: WHITE, B: BLACK)

IMAGE SIGNAL PROCESSING APPARATUS FOR PROMPTER

BACKGROUND OF THE INVENTION

This application claims the priority of Japanese Patent Application No. 8-80997, filed on Mar. 8, 1996 which is incorporated herein by reference.

1. Field of the Invention

The present invention relates to an image signal processing apparatus for prompter, and, more particularly, to signal processing when a manuscript displayed on a display is horizontally scrolled for a newscaster or the like during shooting by a TV camera or the like.

2. Description of the Prior Art

A prompter device with a display positioned near the front of a TV camera is used in broadcasting with the TV camera. The prompter device can display various manuscripts to be read by a newscaster, an MC, or a performer. In such device, an image signal processor performs processing in which image data of a manuscript is captured in an image memory, and then displayed on the display.

That is, the manuscript is being shot by a manuscript camera, and video signals supplied from the manuscript camera are once stored in the image memory. In addition, sub-carriers transmitted simultaneously with the video signals are separated, whereby write and read clock signals are generated based on the sub-carriers. Then, a manuscript image is displayed on the display by writing and reading the image data in and from the image memory with the clock signals. In this case, the manuscript may be vertically or horizontally scrolled or page fed one after another so that the newscaster or the like can read the manuscript.

BRIEF SUMMARY OF THE INVENTION

Object of the Invention

However, the image signal processor of the conventional prompter device has a disadvantage that the sub-carriers used for every fields have phase shifts because the NTSC system employs the four-field sequence, the phase shift causing flickers on the screen so that it is hard to view.

Figure 11:
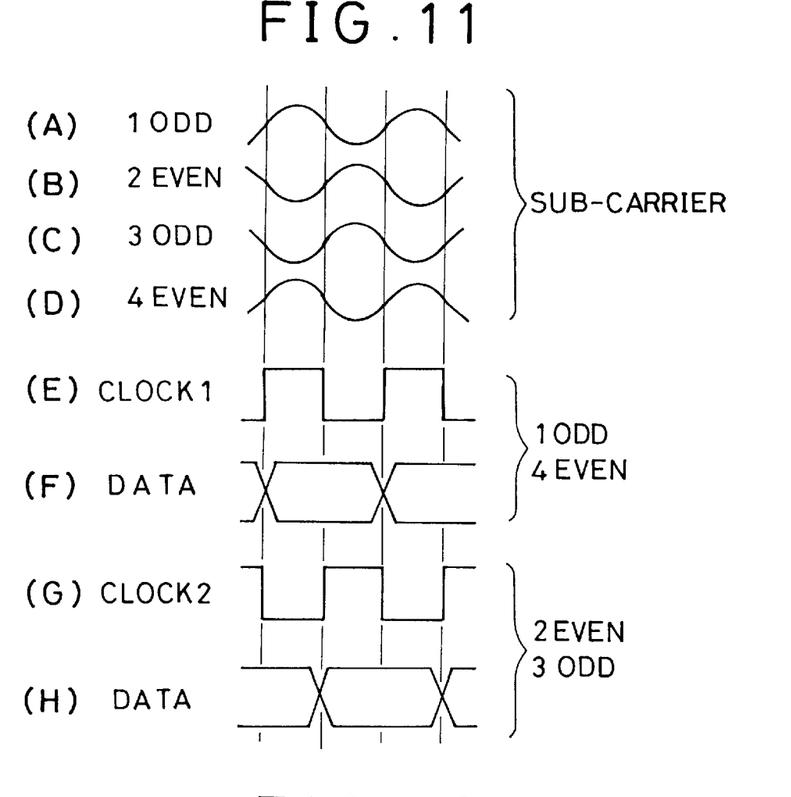
FIG. 11 is waveforms showing signals used by an image signal processing apparatus of the prior art.

FIG. 11 shows waveforms of the sub-carriers and the clock signals. Generally, a frequency such as 4 fsc, 2 fsc, or fsc synchronized to the sub-carrier (frequency fsc) is used as the clock frequency. Here, the above problem is discussed on the frequency of fsc. In the case of four-field sequence, as shown in FIGS. 11 (A)–(D), the sub-carriers are in-phase in the fields of 1 ODD and 4 EVEN, and 2 EVEN and 3 ODD, but there is a phase shift of 180° between 1 ODD and 2 EVEN, or between 3 ODD and 4 EVEN. Such phase shift is called frequency interleaving which is provided so that the color sub-carrier of color image does not affect the screen of monochrome image (the screen being a checkerboard pattern instead of vertical stripes).

Then, the sub-carriers form a clock signal 1 for the 1 ODD and 4 EVEN fields as shown in FIG. 11 (E), and a clock signal 2 for the 2 EVEN and 3 ODD fields as shown in FIG. 11 (G). These clock signals 1 and 2 are also rectangular waves with 180° phase shift. Therefore, a read field data of FIGS. 11 (F) and (H) would be shifted by one half pixel for their display positions.

Figure 12:
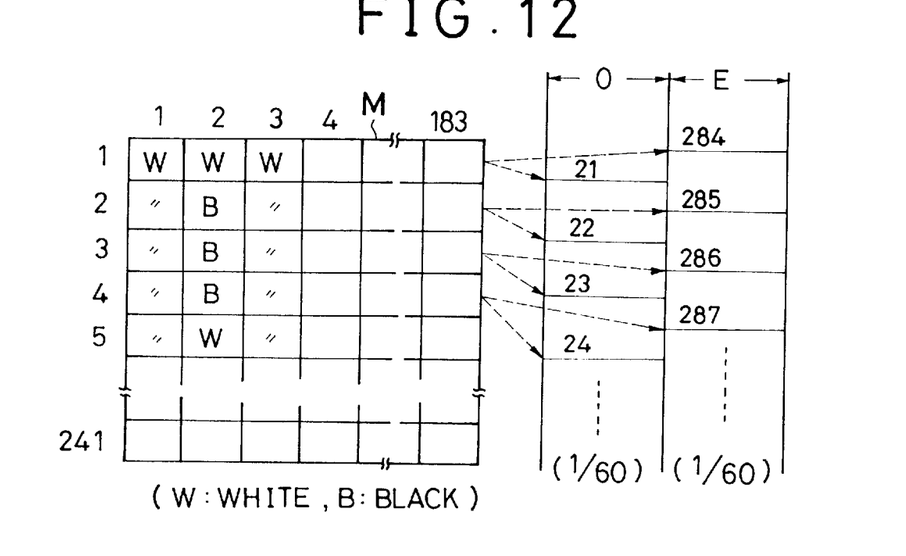
FIG. 12 is diagrams illustrating an image memory of the embodiment or the prior art, and read process from the image memory.
Figure 13A:
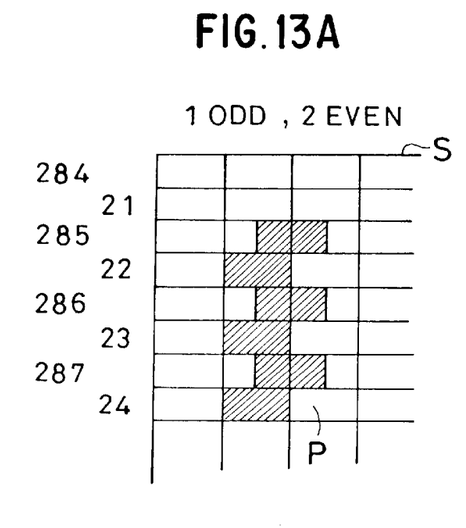
FIGS. 13(A) and (B) are diagrams showing a state of display in the screen of the prompter of the prior art.
Figure 13B:
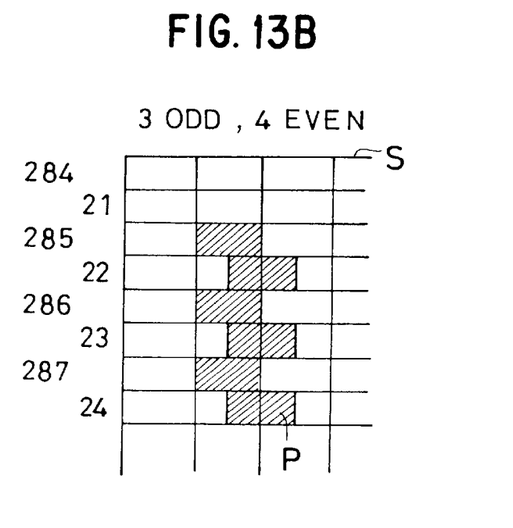

FIG. 12 shows how an image memory (number of pixels: 183×241) M stores data. For example, when it is assumed that black and white data as shown are stored as a part of a character in the manuscript, they are as shown in FIGS. 13 (I) and (II) for the display on the screen in the four-field sequence. That is, the image memory M stores black data at addresses 22, 32 and 42, and these data are read as field data for both odd (ODD) and even (EVEN) fields. For example, data in address 22 is read as 22 ODD horizontal lines and 285 EVEN horizontal lines.

Therefore, as shown in the screen S of FIG. 13 (A), for example, black pixels for lines at 22, 23 and 24 of the 1 ODD field (shaded areas), and black pixels for lines at 285, 286 and 287 of the 2 EVEN field are displayed with one half pixel shift. In addition, as shown in the screen S of FIG. 13 (B), the black pixel of the 3 ODD filed and that of the 4 EVEN field are also displayed with one half pixel shift for their display positions. Moreover, half amount shift also exists between odd fields, and between even fields.

Figure 14:
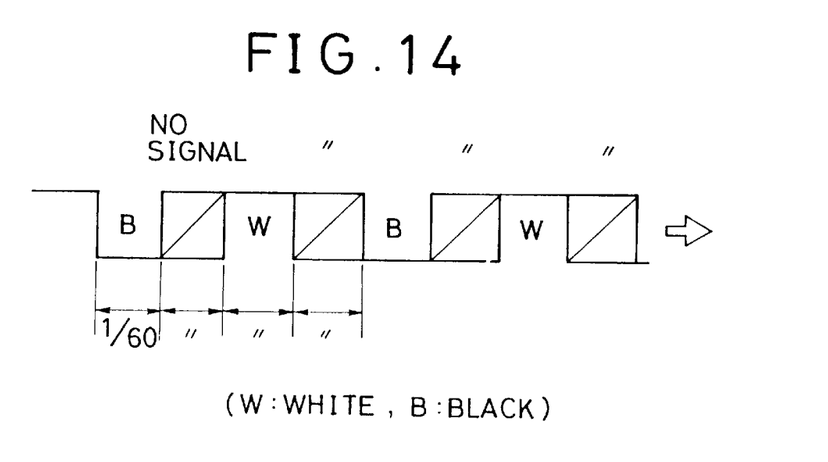
FIG. 14 is a diagram showing display duration of color represented by one pixel on the screen of FIG. 13.

Here, if pixel data at a position P on the screen S in FIG. 13 is noticed, only the pixel in the 3 ODD fields of the four fields is black, and, as shown in FIG. 14, white, no signal, black, and no signal are repeatedly displayed on the screen every 1/60 seconds. Presence of such area caused the line of character to flicker and become hard to view. It is particularly significant for a small character.

In addition, in a conventional prompter, there is a problem that, at a relatively low scrolling speed in the horizontal scroll, for example, in a mode for moving a screen in six seconds, or in a mode for moving a screen in nine seconds, resolution of an image in the horizontal direction is deteriorated because of insufficient horizontal data, leading to a screen difficult to view. Particularly, since such scroll speed is frequently used, there is high necessity for improvement.

That is, when the scroll speed is to be a screen/six seconds as described above, since, as described above, field information for about 180 vertical lines stored in the image memory is displayed in 1/60 seconds, the scroll speed is 6 (seconds)/180/(1/60) (seconds)=2, so that the top vertical line is shifted to the next line in every two fields (every other field). In addition, when the scroll speed is to be a screen/nine seconds as described above, the scroll speed is 9 (seconds)/180/(1/60) (seconds)=3, so that the top vertical line is shifted to the next line in every three fields (every two other fields).

Figure 15:
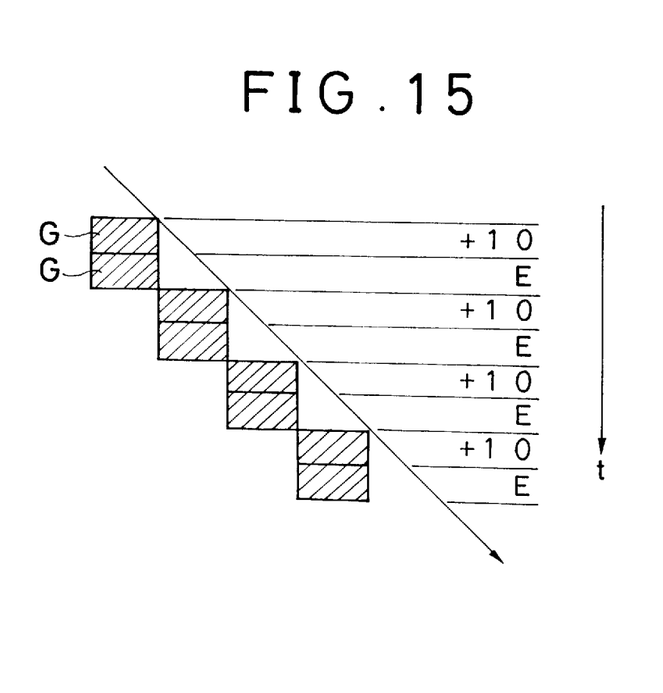
FIG. 15 is a diagram illustrating the display state on the screen in horizontal scroll at the speed of a screen/six seconds in the prior art.

FIG. 15 shows an example of change of one pixel, for example, one pixel G corresponding to black at the address 22 of FIG. 12, at the above-described scroll speed of a screen/six seconds, where the change in scrolling to the right is represented in an oblique direction. In this case, since one vertical line is added in an ODD field (every other field) in the horizontal scroll, as shown in the figure, one pixel G is moved every two fields in a state where it is vertically aligned.

Figure 16:
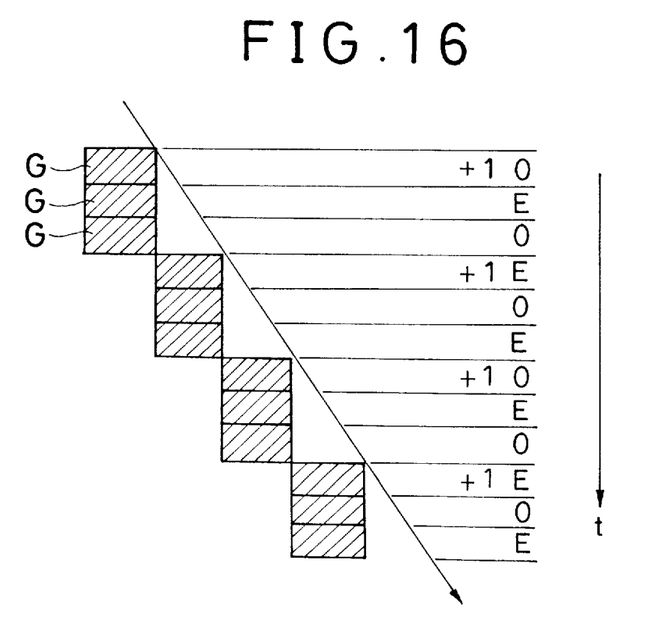
FIG. 16 is a diagram illustrating the display state on the screen in horizontal scroll at the speed of a screen/nine seconds in the prior art.

FIG. 16 shows an example of change of one pixel G at the above-described scroll speed of a screen/nine seconds, where the change in scrolling to the right is also represented in an oblique direction. In this case, since one vertical line is added in every two other fields in the horizontal scroll, as shown in the figure, one pixel G is moved every three fields in a state it is vertically aligned.

In addition to such discontinuous display state, since the number of pixels in the horizontal direction is as small as 183 pixels as described above, there is a problem that the image in horizontal direction flickers and difficult to view.

The present invention is invented in view of the above problem, and intended to provide an image signal processing apparatus for prompter which can eliminate flickering in the horizontal image in horizontal scroll to provide an easy-to-view screen, and which can reduce difficulty to view a screen when clock frequencies synchronized with sub-carriers in the four-field sequence are used.

SUMMARY OF THE INVENTION

To attain the above object, the image signal processing apparatus for prompter according to the present invention comprises a unit for displaying image data of a manuscript with interlace scanning, and horizontally scrolling the displayed manuscript in various speeds; a timing signal generator circuit for generating clock signals with half a cycle shift; and a control circuit for displaying an image while shifting it by half a pixel in horizontal direction every selected field, which field is selected according to the scroll speed, by using the clock signals with half a cycle shift obtained from the timing signal generator circuit when horizontal scroll is performed by sequentially shifting the top vertical line for reading the image memory in horizontal direction for every selected field.

Then, at a scroll speed where the top vertical line for reading the image memory is shifted by half a pixel every other field sequentially read out, the control circuit may perform the shifting by half a pixel when a field not updating the top vertical line is read. For example, at the horizontal scroll speed of a screen/six seconds, even fields are read and processed by the clock signals shifted by half a cycle to display image data shifted by half a pixel. Accordingly, in this case, movement is a one where the screen is shifted by half a pixel every field, so that apparent resolution is increased to reduce flickering.

In addition, at a scroll speed where the top vertical line for reading the image memory is shifted every two other fields sequentially read out, the control circuit may perform the shifting by half a pixel when the last one of three continuous fields is read out. For example, at the horizontal scroll speed of a screen/nine seconds, the last field when three continuous fields are assumed is read and processed by the clock signals shifted by half a cycle. Accordingly, in this case also, the apparent resolution is improved.

Furthermore, when it is applied to an image signal processing apparatus in which clock signals synchronized with sub-carriers for the four-field sequence, it is preferable to cause the clock signal generator circuit to generate in-phase clock signals in which phase shift in the sub-carriers is eliminated. This eliminates phase shift presenting in the sub-carriers, and all data of four fields are read with the in-phase clock signals from the image memory. Accordingly, it is possible to prevent repeated display of white, no signal, black, and no signal in this order with half a pixel shift, and to improve the image in horizontal scrolling.

DETAILED DESCRIPTION OF THE PREFERRED EMBODIMENTS

Figure 1:
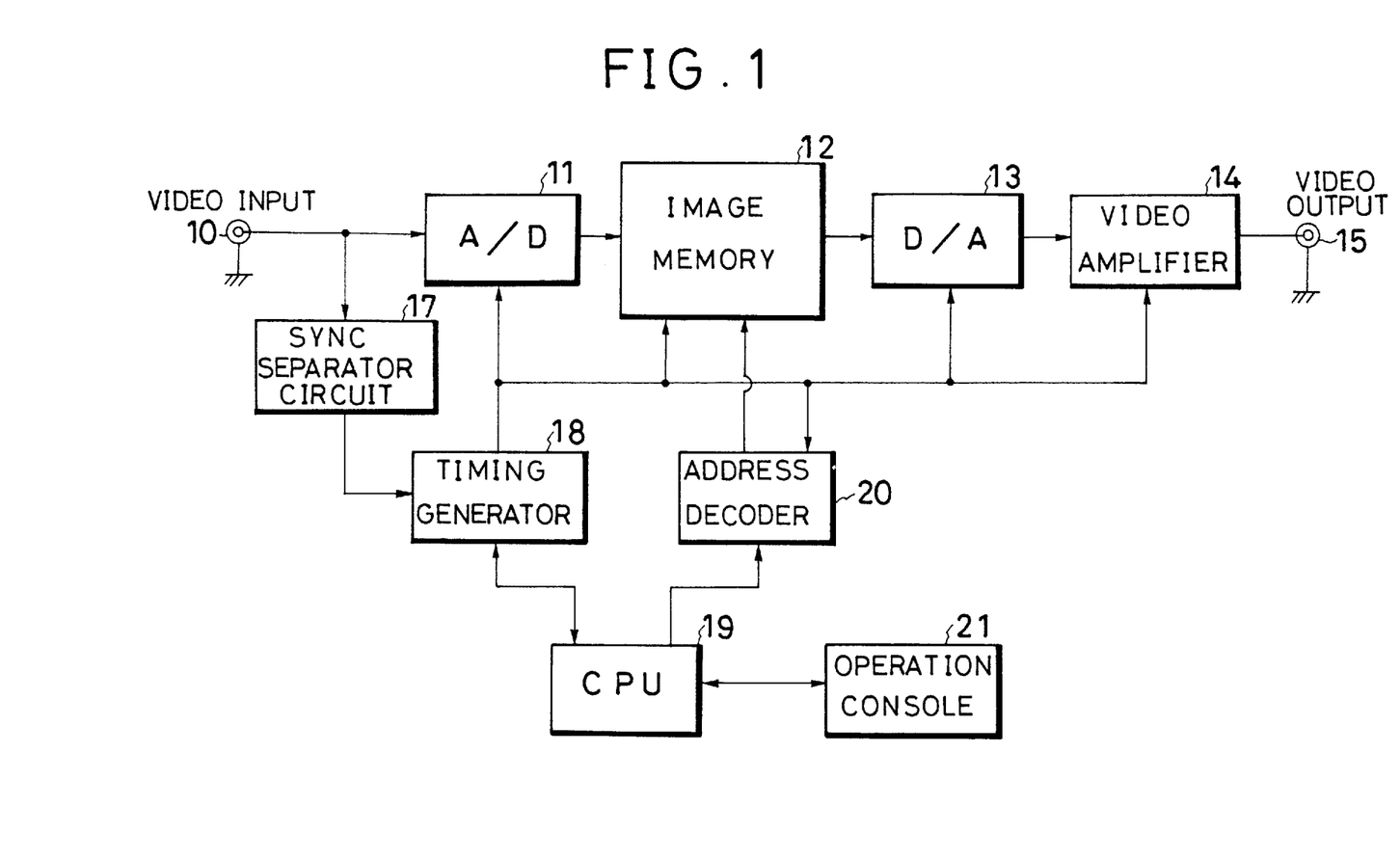
FIG. 1 is a circuit block diagram showing the entire configuration of an image signal processing apparatus for prompter according to an embodiment of the present invention.

FIG. 1 shows the entire configuration of an image signal processing apparatus for prompter which is an embodiment. In the figure, a video input terminal 10 is connected to a video output terminal of a camera for manuscript, and supplies a manuscript image taken by the manuscript camera. The video input terminal 10 is connected to an image memory 12 consisting of SRAMs or the like through an A/D converter 11, the image memory 12 being arranged to be able to store several tens sheets of manuscript. In addition, the image memory 12 is connected to a video amplifier 14 through a D/A converter 13. The video amplifier 14 is connected to the video output terminal 15.

In addition, there are provided a sync separator circuit 17 for receiving a video signal through the video input terminal 10 as input, and separating sub-carriers; and a timing generator (timing signal generator circuit) 18 for forming various timing signals (clock signals) from the sub-carriers obtained by the sync separator circuit 17. The clock signals are supplied to the image memory 12 and other circuits. There are also provided a CPU 19 for managing control, an address decoder 20 for selecting an address specified by the CPU 19, and the like. Furthermore, an operation console 21 for vertical or horizontal scrolling and page feed is provided through a connection with the CPU 19.

Figure 9:
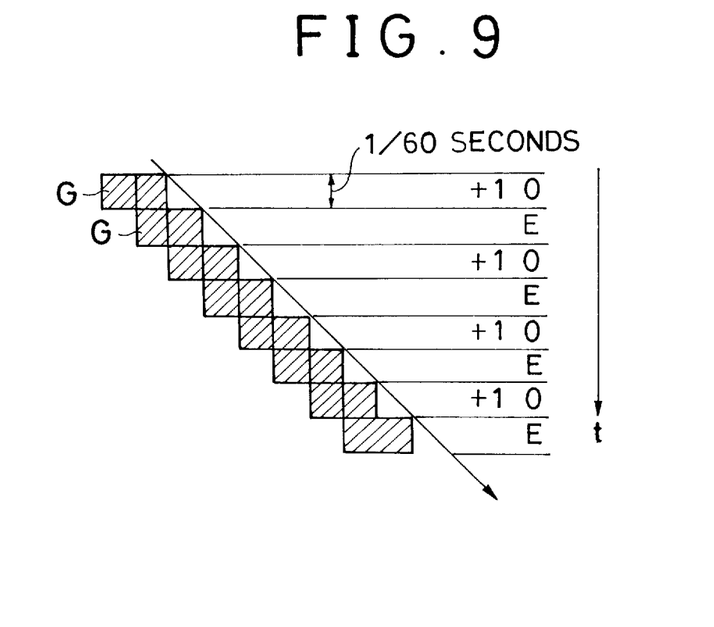
FIG. 9 is a diagram illustrating the display state on the screen at a scroll speed of a screen/six seconds in the embodiment.

On the operation console 21, the horizontal scroll speed can be varied by an operating knob or the like, and can be selected from, for example, a screen/one second to a screen/12 seconds. The CPU 19 performs image processing according to the scroll speed. Then, the CPU 19 of the embodiment updates the top vertical line one after another when reading an ODD field at the scroll speed of a screen/six seconds, and reads the image data of EVEN fields with the clock signals with half a cycle shift (FIG. 9). On the contrary, it may be arranged to update one line in the EVEN field, and to read the data in the ODD field with the clock signals with half a cycle shift.

Figure 10:
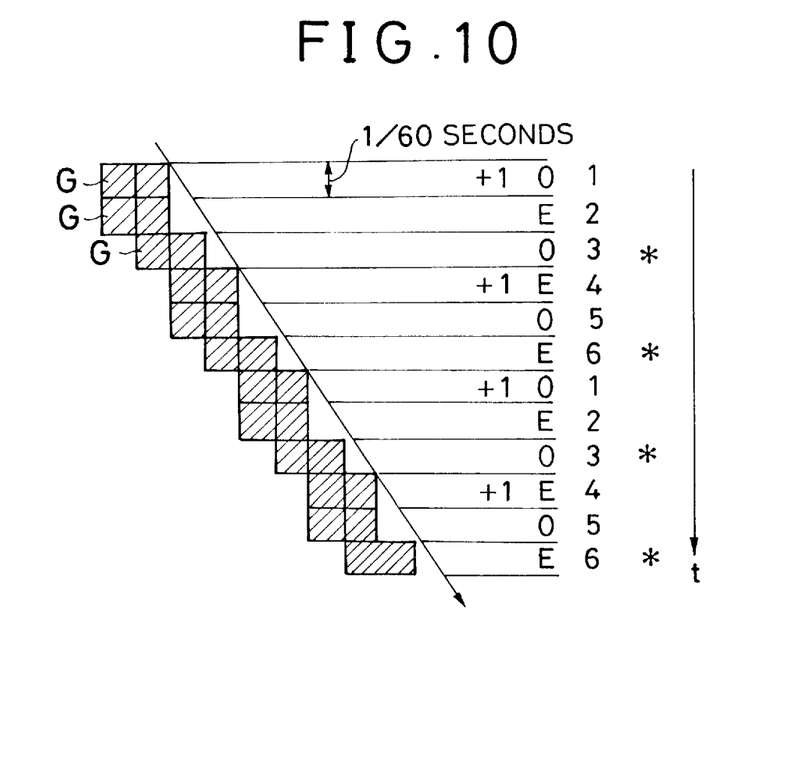
FIG. 10 is a diagram illustrating the display state on the screen at a scroll speed of a screen/nine seconds in the embodiment.

In addition, at the scroll speed of a screen/nine seconds, if six continuous fields are assumed as a block, it is arranged that the top vertical lines are updated one after another when reading the first and fourth fields, and the image data in the third and sixth fields are read with the clock signals with half a cycle shift (FIG. 10).

Figure 2:
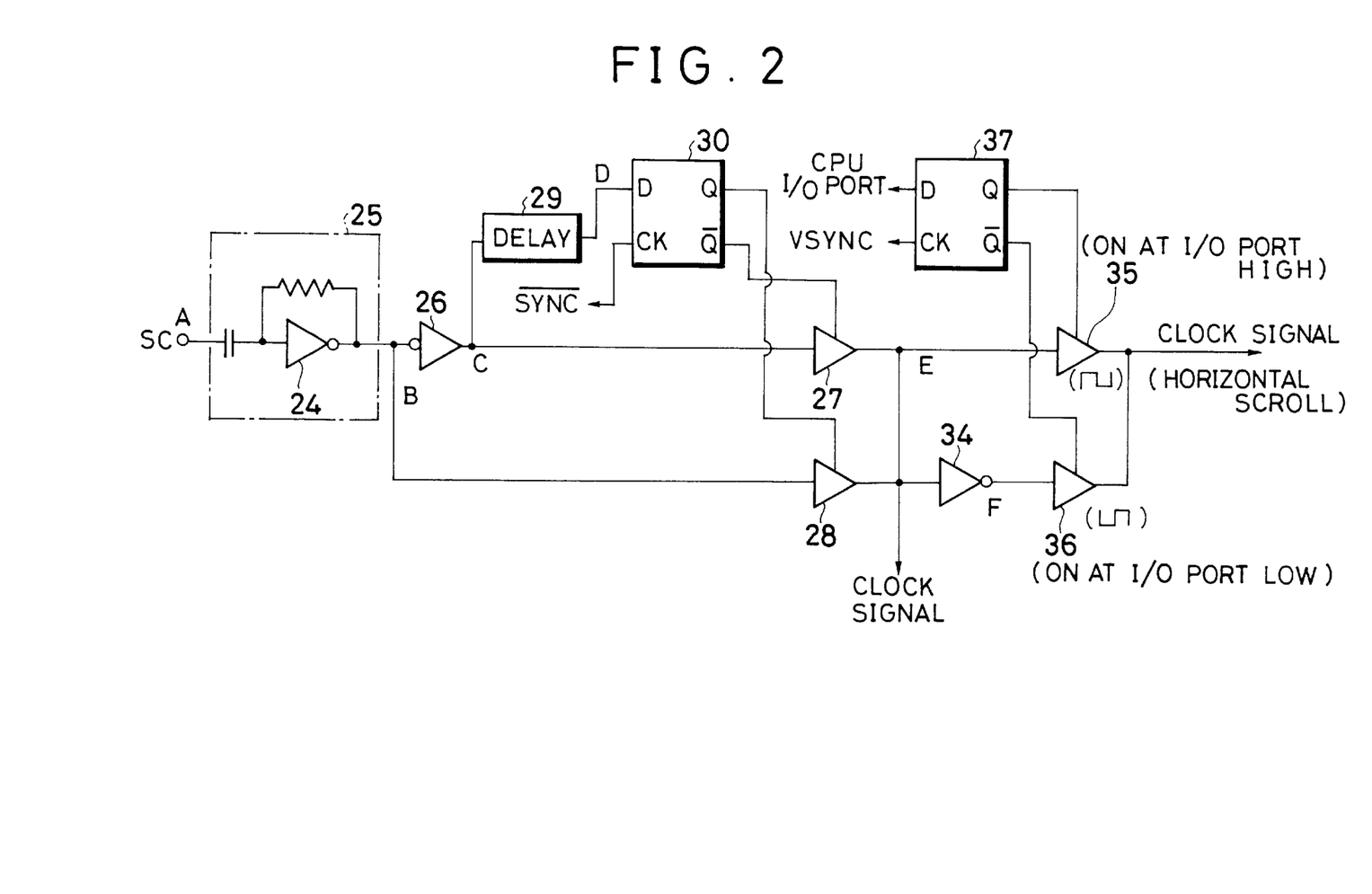
FIG. 2 is a circuit diagram showing the internal configuration of a timing generator of FIG. 1.
Figure 3A:
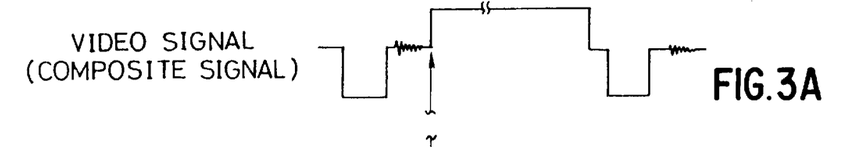
FIG. 3 is waveforms illustrating video signals and synchronizing signals processed by the circuit of FIG. 1.
Figure 3B:
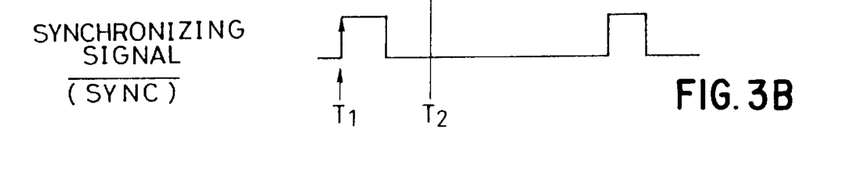

FIG. 2 shows in detail a circuit for forming the clock signals from the sub-carriers in the timing generator 18. The circuit has a waveform converter circuit 25 including an inverter 24 and for receiving the sub-carriers (SC) in sine wave as input and converting them into rectangular waves, another inverter 26 for inverting and outputting the input from the waveform converter circuit 25, a three-state buffer 27 for selecting the output of the inverter 26, and another three-state buffer 28 for selecting the output of the waveform converter circuit 25. There is also provided a delay circuit 29 and a first flip-flop (D type) circuit 30 for turning on either one of the three-state buffers 27 and 28. The first flip-flop circuit 30 is operated by the output of the delay circuit 29 input into a D terminal.

In addition, an inverter 34 is connected to the rear stage of the three-state buffers 27 and 28. There are arranged a three-state buffer 36 to which the output of the inverter 34 is input, and a three-state buffer 35 to which the output of the buffer 27 is input. Then, a second flip-flop circuit 37 for connecting an I/O (input/output) port of the CPU 19 to the D terminal is provided to turn on either one of the three-state buffers 35 and 36. The second flip-flop circuit 37 is operated by the output from the I/O port which allows it to determine whether the current processing is for the ODD field or the EVEN field.

The operation of an embodiment having the above configuration is described by referring to FIGS. 3–8. First, when a write mode is selected by an operation button or the like, the video signal (composite signal) shown in FIG. 3 (A) taken by the manuscript camera is input through the input terminal 10 in FIG. 1. The image signal data of the manuscript is sent to the image memory 12 through the A/D converter 11. At the same time, the sub-carriers (SC) are separated from the video signal in the sync separator circuit 17 in FIG. 1, and the sub-carriers are supplied to the timing generator 18. The timing generator 18 forms the clock signals for write and read with the circuit of FIG. 2.

FIGS. 4(A)–4(J) shows waveforms of signals being formed in every parts of the circuit of FIG. 2. The sine wave sub-carriers (SC) indicated by (A) and (F) in FIG. 4 are supplied to the input of the waveform converter circuit 25. The sub-carriers as discussed in conjunction with FIG. 9 are signals with phase shift of 180° for 1 ODD and 4 EVEN fields shown in (I), and 2 EVEN and 3 ODD fields shown in (II). Here, the start point T1 is assumed to match the rising edge point T1 of the synchronizing signal (inverted) of FIG. 3 (B).

First, description is given on the 1 ODD and 4 EVEN fields of FIGS. 4(A)–4(E). The sub-carrier indicated by (A) is converted into a rectangular wave signal (inverted signal) indicated by (B) by the waveform conversion circuit 25. The rectangular wave signal (B) is inverted by the inverter 26 which is high only when its input is low to form the rectangular wave signal indicated by (C). Then, the rectangular wave signal (C) is delayed by a predetermined amount by the delay circuit 29, and supplied to the D terminal of the first flip-flop circuit 30 as a signal indicated by (D).

Figure 4A:
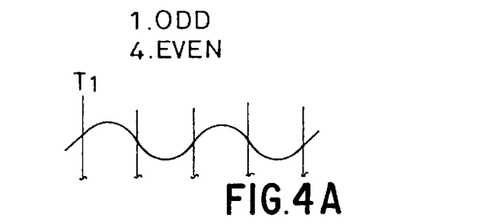
FIGS. 4(A)–4(E) is waveforms of signals obtained in the front stage of the circuit of FIG. 2 based on one of sub-carriers.
Figure 4B:
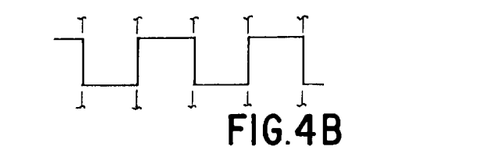
Figure 4C:
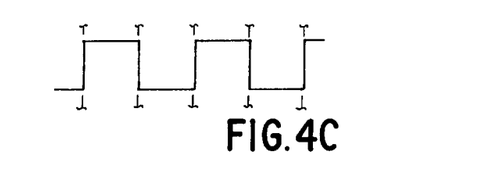
Figure 4D:
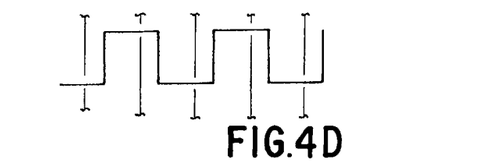
Figure 4E:
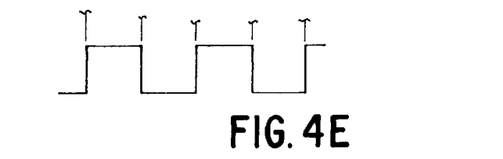
Figure 4F:
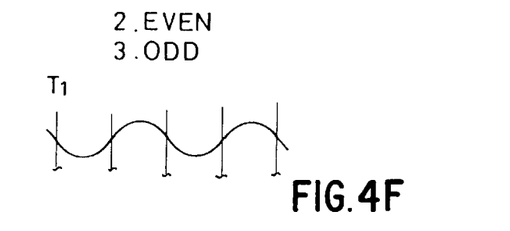
FIGS. 4(F)–4(J) is waveforms of signals obtained in the front stage of the circuit of FIG. 2 based on the other sub-carrier.
Figure 4G:
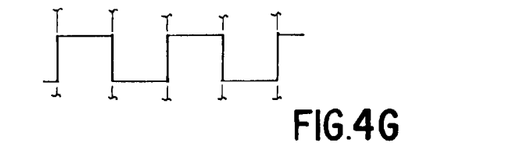
Figure 4H:
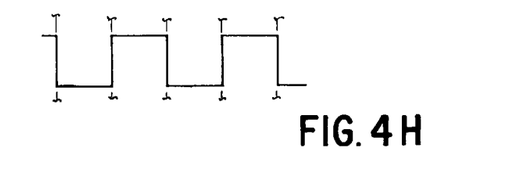
Figure 4I:
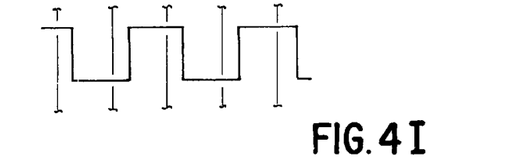
Figure 4J:
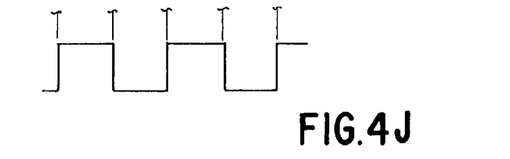

In the first flip-flop circuit 30, since a Q terminal becomes low and a Q bar terminal becomes high when the D terminal input becomes the low state as indicated by (D) at the rising edge (T1) of the synchronizing signal (inverted) provided to a CK terminal, the three-state buffer 27 is turned on (the three-state buffer 28 being at the off state). Accordingly, the three-state buffer 27 output the rectangular wave signal (D) as a clock signal as shown by (E).

On the other hand, the sub-carrier indicated by (F) of FIG. 4 for the 2 EVEN and 3 ODD fields is converted into a rectangular wave signal indicated by (G) by the waveform converter circuit 25 which is a signal the phase of which is shifted by 180° when compared with that of FIG. 4 (B). The rectangular wave signal (B) is inverted by the inverter 26 to provide a rectangular wave signal indicated by (C). The rectangular wave signal (C) is delayed by a predetermined amount by the delay circuit 29.

Then, in the first flip-flop circuit 30, the Q terminal becomes high, and the Q bar terminal becomes low because the D terminal input becomes high as indicated by (D) at the rising edge (T1) of the synchronizing signal provided to the CK terminal. Accordingly, the three-state buffer 28 is turned on (the three-state buffer 27 being at the off state). In this case, as indicated by (E), the rectangular wave signal (B) is output as the clock signal.

Thus, even when the phase of sub-carrier is shifted as indicated by the clock signals (E) and (J) of FIG. 4, in-phase clock signals are generated. Then, the clock signals are utilized as write clock signals from the substantial start point T2 of the video signal of FIG. 3, whereby the video signal is stored in a predetermined address in the image memory 12.

Then, the clock signals (E) are also used in the still image reading operation. Image data is sequentially read from the image memory 12 with the clock signals. The image data is supplied to the video amplifier 14 through the D/A converter 13. Then, after predetermined amplification is performed by the video amplifier 14, the image data is supplied to a prompter display through the video output terminal 15, whereby characters of the manuscript are displayed as an image.

Figure 5:
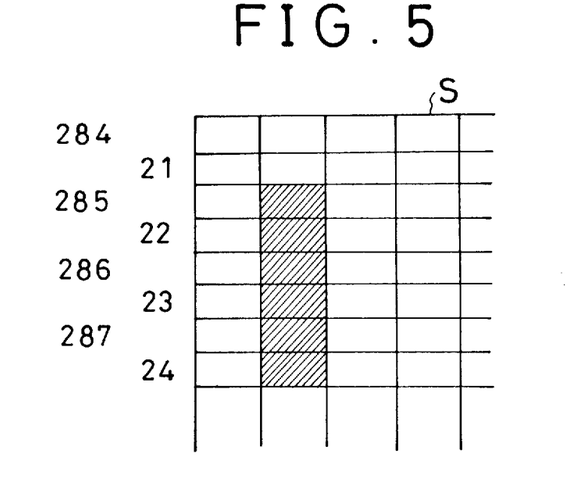
FIG. 5 is a diagram illustrating the state of display of a still image on the prompter in an embodiment.

FIG. 5 shows a state of display of the manuscript image processed with the clock signals of the embodiment, is caused to correspond to the state of memory shown in FIG. 12. That is, since, in this embodiment, the in-phase clock signals (E) are used for all fields of 1 ODD to 4 EVEN, black pixels (shaded areas) for the lines at 22, 23 and 24, and the lines at 285, 286 and 287 are vertically aligned for all four fields without shifting by one half pixel as in FIG. 5 so that flicker disturbance on the screen does not occur, and lines of a character can be clearly displayed.

Then, the clock signals used for the horizontal scroll are generated in circuits after the three-state buffers 27 and 28 in FIG. 2. That is, the rectangular wave signals indicated by (E) are inverted by the inverter 34 to rectangular wave signals with half a cycle shift. Then, in the second flip-flop circuit 37, either a high signal or a low signal is supplied to the D terminal from the I/O port of the CPU 19. Thus, when the vertical synchronizing signal (VSYNC) applied to the CK terminal is high, the three-state buffer 35 turns on if the D terminal becomes high, and the three-state buffer 36 turns on if the D terminal becomes low.

Figure 6:
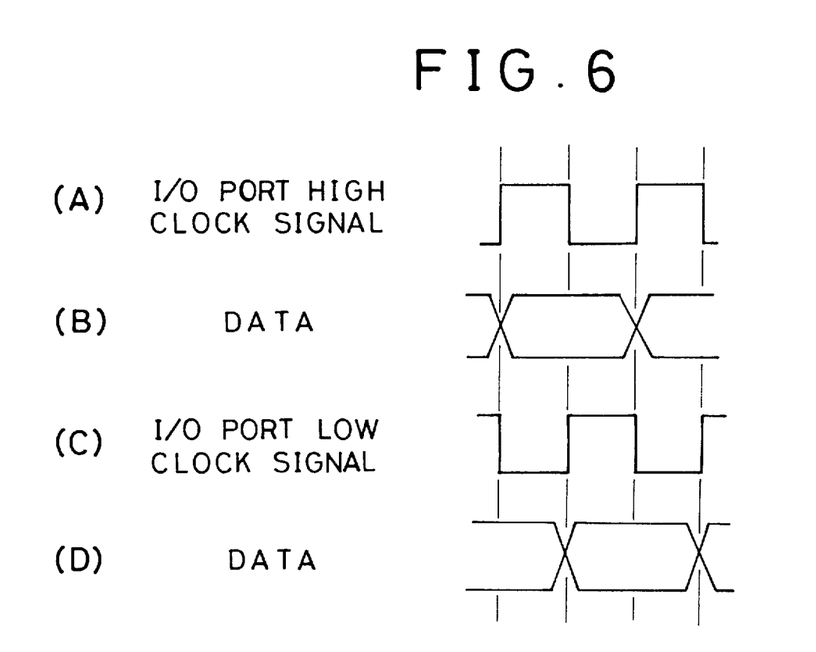
FIG. 6 is waveforms of signals obtained in the rear stage of the timing generator of FIG. 2, and image data read with them.

FIG. 6 shows clock signals used for the horizontal scroll. The three-state buffer 35 outputs a rectangular wave signal indicated by (A) which is the same as FIG. 4 (E) as a normal clock signal for scroll. In addition, the three-state buffer 36 outputs a rectangular wave clock signal with half a cycle shift which is in turn used as a read signal in displaying a selected predetermined field.

Such clock signals are output when the horizontal scroll is performed by the operation at the operation console 21. Now, the operation when a scroll speed of screen/six seconds or a screen/nine seconds is selected is described in conjunction with the flowchart of FIGS. 7 and 8.

Figure 7:
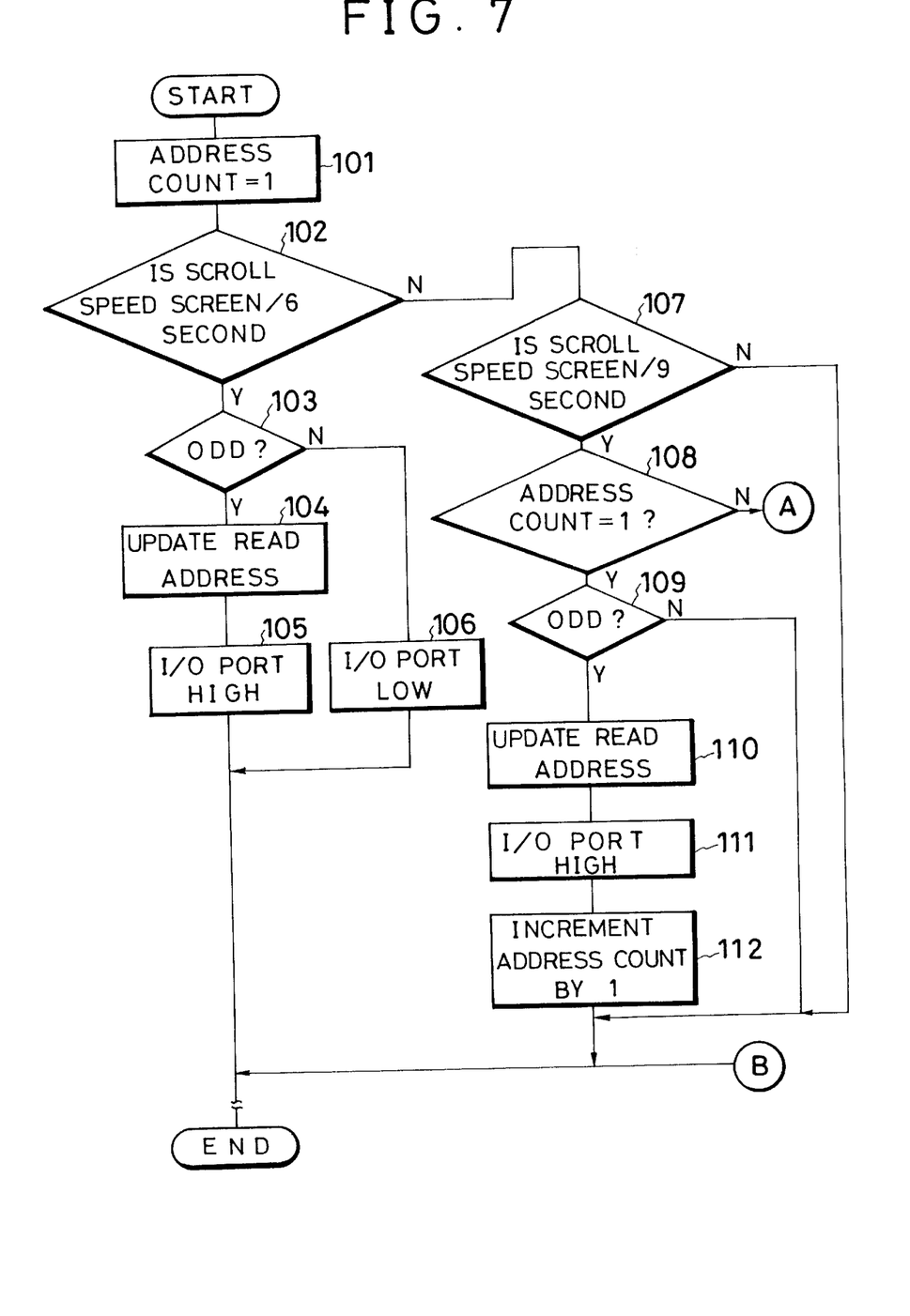
FIG. 7 is a flowchart illustrating operations in a CPU in FIG. 1.

In FIG. 7, an address counter is first set to 1 in step 101 to select a predetermined field. In the next step 102, it is determined whether or not the scroll speed is set to a screen/six seconds. If YES (Y), the process proceeds to step 103 where the next read field is determined for whether or not it is an ODD field. If YES, the address of the top vertical line in the ODD field is incremented by one line to update the display for one screen (step 104), and the I/O port of the CPU 19 is set to high in the next step 105. Accordingly, for the ODD field where the data is horizontally updated, the three-state buffer 35 (FIG. 2) turns on, and the read process is performed with the clock signal of FIG. 6 (A).

If it is determined in step 103 that it is an EVEN field (NO), the process proceeds to step 106 where the I/O port of the CPU 19 is set to low for an EVEN field. Accordingly, in the EVEN field, the three-state buffer 36 (FIG. 2) turns on, and the read process is performed with the clock signal with half a cycle shift of FIG. 6 (C).

FIG. 9 shows the display state on the screen in this case. Since the EVEN field is processed with the clock signal with half a cycle shift, the pixel G is also shifted by one half as shown in the figure. Thus, when compared with the case of FIG. 15, the pixel G continuously moves to increase apparent resolution twice, so that flickering of the image is reduced.

Then, in a case of NO in step 102 of FIG. 7, step 107 determines whether or not the scroll speed is set to a screen/nine seconds. If YES, the process proceeds to step 108 where the address count is determined to be 1 or not. If YES, the next step 109 determines whether or not the next read field is an ODD field. Then, the next step 110 increments the address of the top vertical line in the ODD field by one line to update display of one screen. Step 111 turns the I/O port of the CPU 19 to high. Finally, step 112 increment the address count by one.

Figure 8:
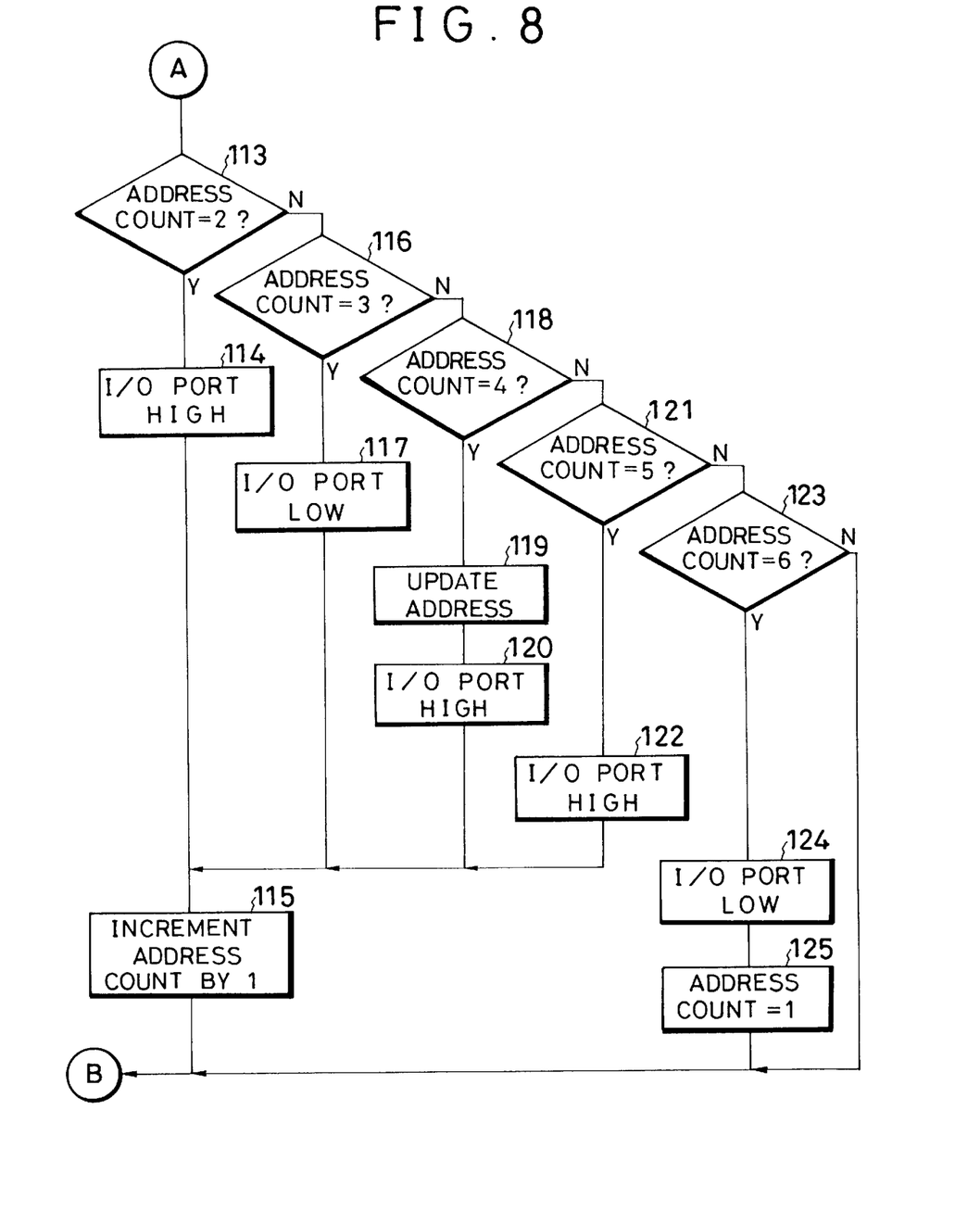
FIG. 8 is a flowchart illustrating operations in a CPU in FIG. 1 and continued from FIG. 7.

If the address count is not one in step 108, then the process proceeds to step 113 in FIG. 8 where it is determined what is the address count up to step 123 in such a manner that, if the address count is not two, then the process proceeds to the step 116. Then, as shown in the figure, if the address count is four, the process increments the address of the top vertical line by one line as in the case where the address count is one, and turns the I/O port to high. If the address count is two or five, the process turns the I/O port to high (step 114 or 122), and finally increments the address count by one (step 115).

Then, if the address count is three or six, the process turns the I/O port to low (step 117 or 124), and, if the count is three, finally increments the address count by one (step 115), but, if the count is six, returns the count to one in step 125. Therefore, if the address count is three or six, the image data is read with the clock signals with half a cycle shift.

FIG. 10 shows the display state on the screen at the scroll speed of a screen/nine seconds. When six fields are assumed to be one block as in above, the vertical line is horizontally moved by one line in the first and fourth fields. Then, the third and sixth (*) fields are processed with the clock signals with half a cycle shift, whereby the pixel G is shifted by one half as illustrated. Accordingly, when compared with the case of FIG. 16, the pixel G continuously moves to improve apparent resolution, so that flickering of the image is reduced.

While the above embodiment is arranged to reduce flickering in the horizontal scroll after preventing flickering of a still image caused from the characteristics of sub-carriers, the present invention can be applied to a case where the front stage from the waveform converter circuit 25 to the inverter 32 in FIG. 2 is not used. In this case also, although the order of fields to be selected differs, it is sufficient to perform control so that the displayed pixels are continuous by shifting their display positions by half a pixel by using clock signals with half a cycle shift.

As described, according to the embodiment, since it is arranged that, in the case of a screen/six seconds, for example, the EVEN fields are read and processed with clock signals with half a cycle shift, and, in the case of a screen/12 seconds, the last one of three continuous fields is read and processed with clock signals with half a cycle shift, pixels can be continuously moved in the horizontal scroll, thereby eliminating flickering in the horizontal image and obtaining a screen easy to view. In addition, there is an advantage that flickering of the image in the horizontal scroll can be efficiently reduced after the phase shift inherent to the sub-carriers used in the four-field sequence.

What is claimed is:

1. An image signal processing apparatus for prompter comprising:

an image memory for storing manuscript data;

a display for displaying the image data read from said image memory based on clock signals with interlace scanning;

a timing signal generator circuit for generating clock signals with half a cycle shift; and a control circuit for controlling a horizontal scroll speed on said display, and for displaying the image while shifting it by half a pixel in horizontal direction every selected field, which field is selected according to said scroll speed, by using the clock signals with half a cycle shift obtained from said timing signal generator circuit when horizontal scroll is performed by sequentially shifting the top vertical line for reading said image memory in horizontal direction for every selected field.

2. An image signal processing apparatus for prompter as set forth in claim 1, wherein, at a scroll speed where the top vertical line for reading said image memory is shifted by half a pixel every other field sequentially read out, said control circuit performs the shifting by half a pixel when a field not updating the top vertical line is read.

3. An image signal processing apparatus for prompter as set forth in claim 1, wherein, at a scroll speed where the top vertical line for reading said image memory is shifted every two other fields sequentially read out, said control circuit performs the shifting by half a pixel when the last one of three continuous fields is read out.

4. An image signal processing apparatus for prompter as set forth in claim 1, wherein, when the image data is applied to an image signal processing apparatus in which clock signals synchronized with sub-carriers for four-field sequence are formed, said timing signal generator circuit generates in-phase clock signals in which phase shift in the sub-carriers is eliminated.

* * * * *